United States Patent

[11] 3,575,622

[72] Inventors James W. Nielson
Kettering;
Virgil W. Raby, Dayton, Ohio
[21] Appl. No. 853,828
[22] Filed Aug. 28, 1969
[45] Patented Apr. 20, 1971
[73] Assignee General Motors Corporation
Detroit, Mich.

[54] ROTOR RESISTOR ASSEMBLY FOR AC INDUCTION MOTORS
6 Claims, 10 Drawing Figs.
[52] U.S. Cl.................................................. 310/166,
310/72
[51] Int. Cl........................................................ H02k 17/00
[50] Field of Search............................................ 310/166,
48, 167, 62, 63, 175, 72, 176, 261, 212, 262;
338/283, 321, 316; 336/120—123

[56] References Cited
UNITED STATES PATENTS
1,256,705 2/1918 Lebouici ....................... 310/166
2,748,333 5/1956 Lee .............................. 310/212

FOREIGN PATENTS
1,178,936 10/1964 Germany..................... 310/166

*Primary Examiner*—D. X. Sliney
*Assistant Examiner*—R. Skudy
*Attorneys*—E. W. Christen, C. R. Meland and Robert W. Smith ABSTRACT: A rotor resistor assembly for a wound rotor induction motor includes resistors formed by metal bars which are wound in circular coils extending circumferentially around the rotor shaft. The resistors are mounted on the rotor shaft by a support member which includes pivotal linkages movably connecting the resistors to the support member. The resistors respectively expand and contract radially when heated and cooled and a counterweight included in the pivotal linkages maintains radial tension on the coiled bar resistors when the assembly is rotated at high speeds. A fan impeller arrangement extending from the support member circulates cooling air through the resistors.

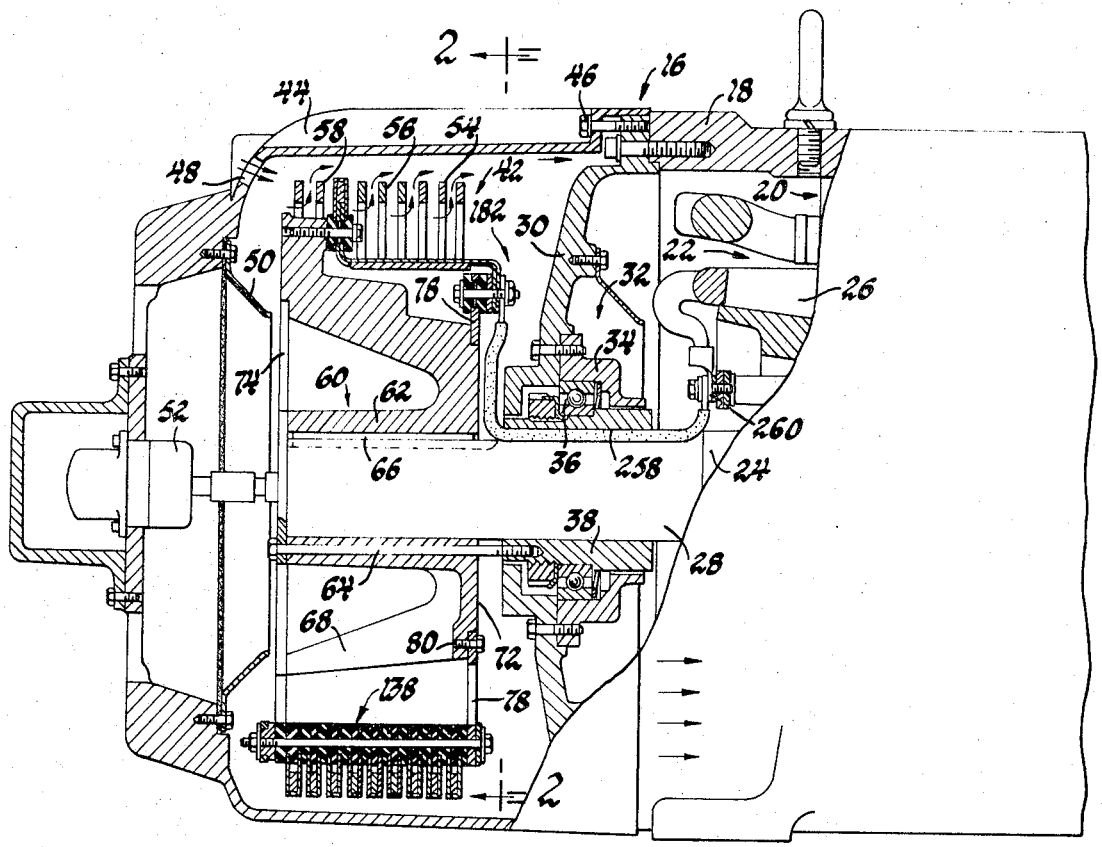

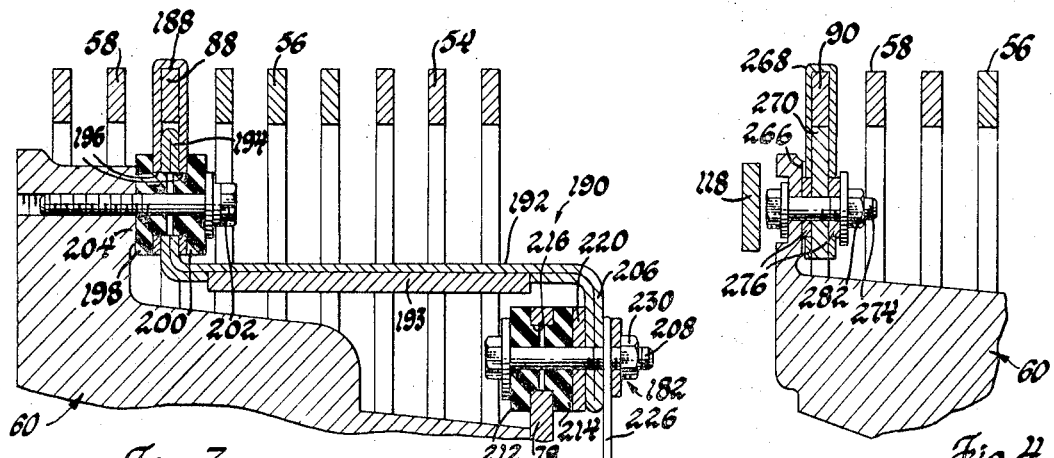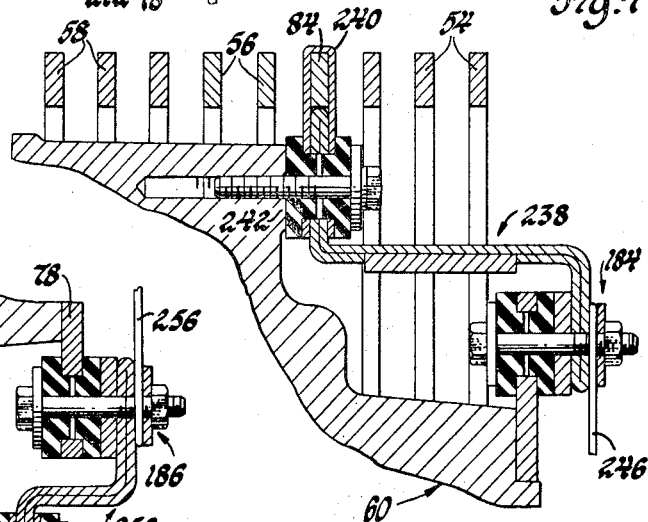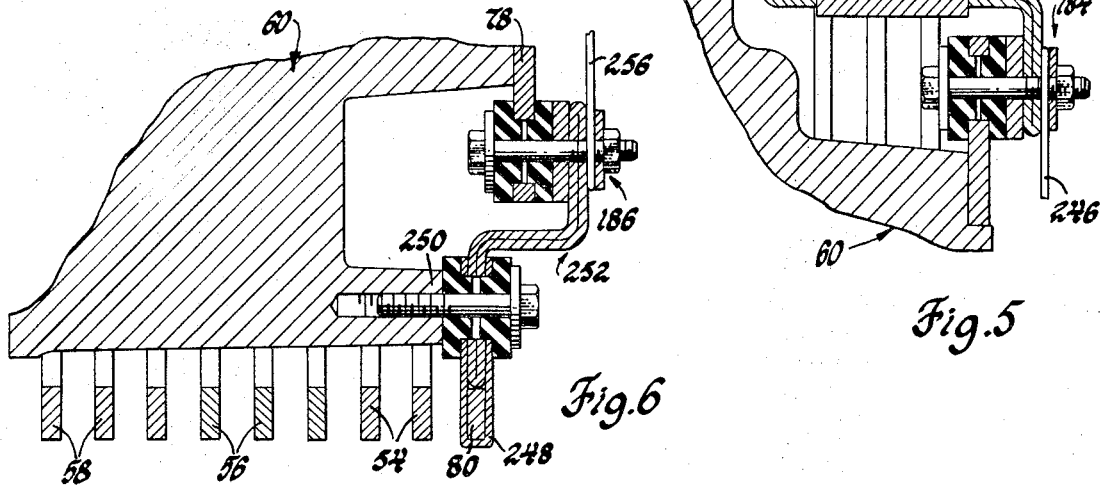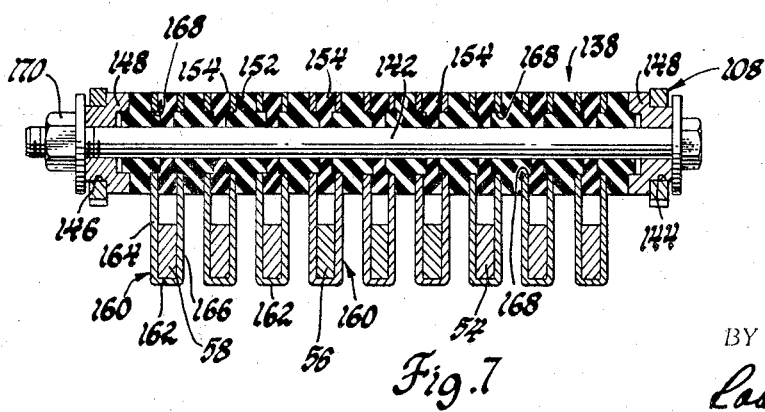

PATENTED APR 20 1971

INVENTORS.
James W. Nielson &
BY Virgil W. Raby

Robert W. Smith
ATTORNEY

ROTOR RESISTOR ASSEMBLY FOR AC INDUCTION MOTORS

This invention relates to alternating current electric motors and more particularly to an improved rotor resistor mounting and cooling assembly for wound rotor induction motors.

In the field of the present invention, it is well known that increase of resistance in the rotor circuit of an AC induction motor varies the motor output torque and speed characteristics. The higher rotor resistance increases the motor slip characteristic which determines the torque developed by an induction motor at a given motor speed. Increasing the slip characteristic accordingly increases the output torque of the motor at starting or low rotor speeds. In certain large horsepower, fan-cooled motors having high-slip characteristics, resistor elements for increasing the rotor resistance are mounted directly on the rotor shaft. The resistors are usually carried by a shaft mounted hub member enclosed by a cover extending from the one end of the motor housing. One such arrangement is disclosed and claimed in U.S. Pat. No. 2,910,600 for A Rotor with Heat Radiating Means issued Oct. 27, 1959 and assigned to the assignee of this invention.

Rotor mounted resistor assemblies generally include resistors capable of conducting high current values, a support for mounting the resistors on a shaft, and a cooling fan arrangement for circulating air across the resistors. By mounting the rotor resistors directly on the rotor shaft, a compact arrangement is provided which is integral with the motor, thereby eliminating the use of sliprings to connect the resistors to the rotor circuit. Also, rotating the resistors on the rotor shaft conveniently aids resistor cooling.

It is desirable that the assemblies do not unduly increase the size or the weight of the motor and that the rotor resistors are rugged, are capable of being securely mounted and that they include expanded cooling surfaces to aid dissipation of high resistor temperatures. Materials used for many prior rotor resistors include Nichrome or a nickel-iron based metal in a wire or thin ribbon form. These metals are not entirely satisfactory in many instances since they are expensive, are difficult to machine and work, and limit the mounting arrangements which can be used. Another notable consideration is the level of noise developed in many prior rotor resistor assemblies. Noise often becomes excessive and objectionable at high rotor speeds. This is particularly undesirable when the assembly is included in a motor drive used in factory environments having personnel working nearby. The noise is developed at high shaft speeds by wind resistance of the resistors causing air turbulence and vibrations.

In the present invention, a rotor resistor assembly is provided which includes a support member mounted on a shaft extension of a wound rotor induction motor. A plurality of resistors are provided by metal bars which are formed into coils. The resistor ends are mechanically and electrically connected to radially extending ends of the support member which include terminals for connecting the resistors to terminal leads of motor windings also mounted on the rotor. Middle portions of the resistors are carried by pivotal linkages which are pivotally mounted on the outer peripheral edges of the radial ends of the support member. The resistors expand and contract radially within the support member as they respectively become heated when conducting large values of rotor current and when cooled by air flow developed by impellers provided on the support member. Counterweights are connected to the linkages to restrain resistor vibrations when the assembly is rotated at high speeds. The counterweights also aid in maintaining balance of the assembly as it is rotated at varying speeds.

Accordingly, it is an object of this invention to provide an improved rotor resistor and fan assembly for induction motors including a fan means for circulating air and resistor elements which are shaped so as to have low wind resistance and to be efficiently cooled by the circulating air flow without developing objectionable noise and vibrations.

A further object of this invention is to provide an improved rotor resistor mounting and cooling assembly mounted to a shaft extension of an induction motor that includes resistor elements formed by metal bars which are coiled circumferentially about the shaft extension and spaced so as to provide exposed expanded area cooling surfaces which do not cause excessive air turbulence when the resistors are rotated at high speeds.

A still further object of this invention is to provide a rotor resistor assembly having coiled resistor bars carried on a support member by a pivotal mounting arrangement which permits the resistor coils to expand and contract and which provides radially inwardly directed tension forces on the resistors to oppose centrifugal and vibratory forces developed on the rotating resistors.

A still further object of this invention is to provide a rotor resistor and fan assembly including a lightweight and rugged aluminum support member connected to the shaft of a fan-cooled induction motor for carrying resistors that are connected to windings mounted on the rotor in which the resistors are formed of a coiled stainless steel bar material that provides a desired impedance for producing higher motor torque characteristics, and with a support member which additionally includes pivotal linkage assemblies having counterweights for movably supporting the resistors so that the resistors can expand and contract in response to heating and cooling conditions while being firmly supported in a balanced assembly capable of being rotated at high speeds.

Further objects and advantages of the present invention will be apparent from the following description, reference being made to the accompanying drawings wherein a preferred embodiment of the invention is shown.

IN THE DRAWINGS

FIG. 1 is a partially sectioned side elevational view of a dynamoelectric machine including the present invention.

FIG. 2 is an end plan view looking in the direction of arrows 2—2 in FIG. 1.

FIG. 3 is a fragmentary cross section view looking in the direction of the arrows 3—3 in FIG. 2.

FIG. 4 is a fragmentary cross section view looking in the direction of arrows 4—4 in FIG. 2.

FIG. 5 is a fragmentary cross section view looking in the direction of arrows 5—5 in FIG. 2.

FIG. 6 is a fragmentary cross section view looking in the direction of arrows 6—6 in FIG. 2.

FIG. 7 is a fragmentary cross section view looking in the direction of the arrows 7—7 in FIG. 2.

Figure 8:
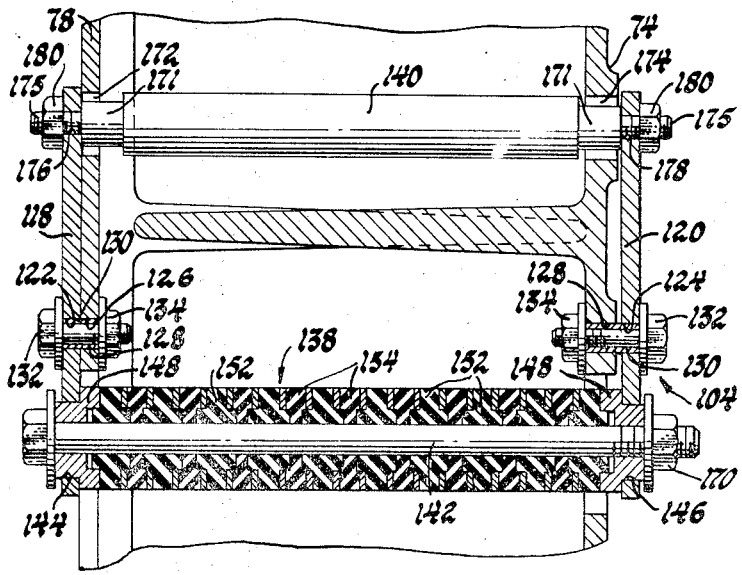
FIG. 8 is a fragmentary cross section side view of the rotor resistor and fan assembly of this invention illustrating one pivotal mounting assembly provided for mounting the resistors to the support member.

Referring now to the drawings wherein the same numeral is used for the same or like elements throughout the several FIGS. and referring more particularly to FIG. 1 wherein is shown an electric motor 16 including the present invention. The electric motor 16 includes a housing including frame 18 having an external surface including heat radiating fins, not shown, and an inner portion supporting a stator assembly 20. The stator assembly 20 includes a laminated core having slots receiving a stator winding. A rotor assembly 22 includes a shaft 24 that carries a laminated core having a rotor winding 26. The rotor shaft 24 includes one end which has a shaft extension 28 extending externally of the stator assembly. An end frame 30 including a center shaft opening is mounted to one end of the frame 18. A bearing assembly 32 which is mounted to the end frame 30 at the center opening supports the end of shaft 24 including the shaft extension 28. The opposite end of the motor housing includes a second end frame, not shown, rotatably supporting a second end of the shaft 24.

The bearing assembly 32 includes a housing 34 mounted on the inner side of the end frame 30. A ball bearing 36 includes an outer race fitted in the housing 34 and an inner race carried on a shaft sleeve 38 fixed to the shaft extension 28.

The electric motor 16 illustrated in FIG. 1, in one preferred embodiment, includes a four-pole three-phase wound rotor induction motor having a wye-connected rotor winding 26. This motor has a power rating in the order of 200 h.p. The electric motor 16 is characterized as a high-slip fan cooled induction motor of the type used to drive machine tools such as metal forming presses which have large cyclic variations of speed. Machine tools using these motors include operating cycles requiring high torques at starting and low speeds and low torques at higher speeds. These motor drive characteristics are produced by the high-slip characteristics which are provided when high external resistance is connected to the rotor winding.

The motor 16 includes the improved rotor resistor assembly of this invention which is generally designated by numeral 42. The assembly 42 is mounted on the shaft extension 28. A cover 44 formed of cast aluminum encloses the rotor resistor assembly 42 and is mounted on the end frame 30 by bolts 46 to form an extension of the motor housing. Ventilating openings 48 are provided in the outer end of the cover 44 to admit air which is circulated through the assembly 42 and exhausted through openings formed between the end of the cover 44 and the outside of the motor housing. A baffle 50 is secured to the inner end of the cover 44 to direct incoming air through the resistor assembly and radially outward toward the internal surface of the cover. An antiplugging switch 52, which does not form part of this invention, is shown supported by the outer end of cover 44 and coupled to the end of shaft extension 28.

The rotor resistor assembly 42 of this invention includes three resistor elements 54, 56 and 58 also referred to hereinbelow as coiled bar resistors. The resistor elements are carried by a support member, generally designated by numeral 60, which is mounted on shaft extension 28. The support member 60 is formed of a cast aluminum material and includes a hub portion 62 which is secured to the shaft extension 28 by a plurality of bolts 64 axially extending through the hub 62 and secured to the bearing sleeve 38. A key 66 is inserted into aligned end slots respectively provided on the inner surface of the hub 62 and on the shaft extension 28.

Having described the principal parts of the rotor resistor assembly 42 of this invention, reference is now made to the FIGS. 2 through 9 illustrating the details of the assembly.

The support member 60 includes a plurality of fan impellers 68 which are formed integrally with the hub 62. The impellers 68 extend axially between an inner radial end 72 and an outer radial end 74 respectively of the support member 60. The impellers 68 extend outwardly toward outer circumferential edges of the support member ends and terminate so as to be spaced below the inner radius of the resistors 54, 56 and 58.

A flat steel plate 78, having a configuration including six radially projecting areas as illustrated in FIG. 2, is secured by a plurality of bolts 80 to the inner end 72 of the support member. The six projecting areas provide supporting and mounting areas which are axially aligned with similar supporting and mounting areas formed integrally on the outer radial end 74 of the support member 60 and are explained in detail hereinbelow.

Figure 9:
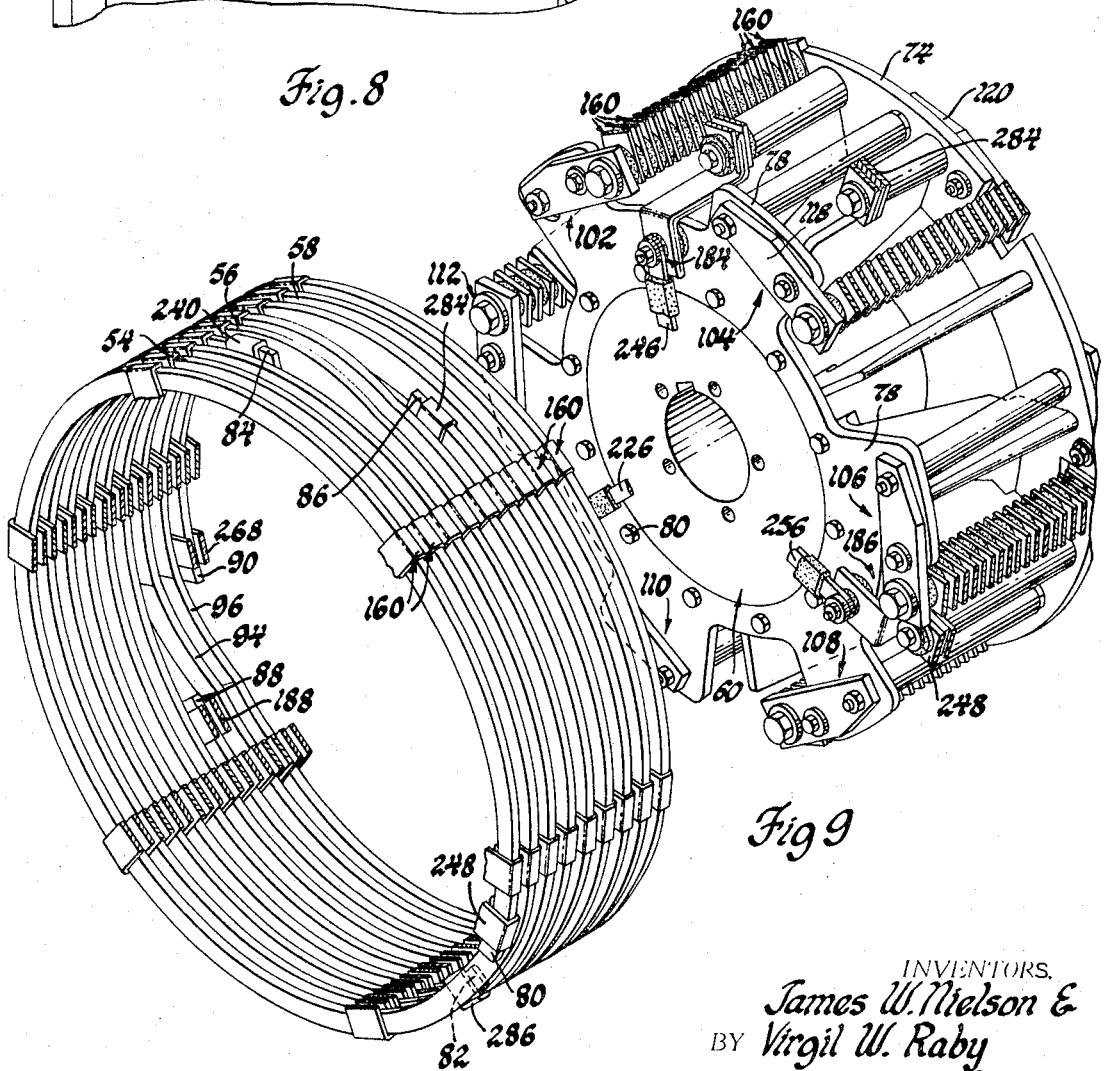
FIG. 9 is a partially exploded perspective view illustrating a rotor resistor assembly broken away from a support member along brackets provided on a pivotal mounting assembly of the present invention.

The coiled bar resistors 54, 56 and 58 are more clearly shown in the partially exploded perspective view of FIG. 9. The resistance material forming the resistors is provided by three substantially identical coiled bars, each comprising a rectangular stainless steel metal bar having short and long sides with dimensions of approximately one-quarter inch by three-quarter inch and a length of approximately 202 inches. The stainless steel bars are wound into substantially circular rings by placing the long sides upright on a mandrel so that each bar forms a coil of several coil turns having an outside diameter of approximately 22½ inches. The coil turns are wound so as to progress in an axial direction with approximately ½-inch spacing between the adjacent sides of the coil turns as described hereinafter.

Each coil of the coiled bar resistors 54, 56 and 58 includes approximately three complete coil turns terminating respectively in coil ends designated 80 and 82 on resistor 54, coil ends 84 and 86 on resistor 56, and coil ends 88 and 90 on resistor 58. Two axial transition portions are formed by axial bends in each coil to provide the aforementioned axial spacing or offset between the adjacent coil turns. For example, transition portions 94 and 96 are shown in the coiled bar resistor 58. The two transition portions 94 and 96 are parallel and extend arcuately for approximately 20° of the circumference of each turn coil. Each of the transition portions begin slightly before one coiled end, for example, the coil end 88, and extend to an arcuate location past a second coil end, for example, the coil end 90 which is arcuately spaced about 12° from coil end 88. When the three resistors 54, 56 and 58 are assembled, the centers of the respective transition portions of each resistor are equally spaced circumferentially or approximately 120° from the transition portions of the other two resistors.

The coiled bar resistors 54, 56 and 58 which are formed from stainless steel bars having the dimensions noted hereinabove have a resistance, between the ends thereof, of approximately 0.03 ohms at 25° C.

The coiled bar resistors 54, 56 and 58 are mounted on the support member 60 so as to extend axially between the radial ends 72 and 74 by six movable mounting assemblies interconnecting the coil turns and fixed mounting arrangements connected to the coil ends. The movable mounting assemblies include pivotal linkages which are designated 102, 104, 106, 108, 110 and 112 in FIGS. 2 and 9. The linkages are circumferentially spaced equally every 60° around the outer radially projecting areas of the radial ends of support member 60. The FIG. 8 illustrates a partial side view, in section, of the rotor resistor assembly 42 showing a typical pivotal linkage, for example linkage 104. It is to be understood that the pivotal linkage 104 is identical to the other pivotal linkages 102 and 106 through 112 and is described in detail hereinafter.

A pair of identical pivot arms 118 and 120 are illustrated in place at the outer sides of the radially projecting supporting areas of the plate 78 and the outer radial end 74 of the support member 60. The pair of pivot arms are oppositely disposed in parallel relationship and are respectively provided in middle portions thereof with hole openings 122 and 124 which are mutually aligned. Corresponding hole openings 126 and 128 are respectively provided in the plate 78 and in the outer radial end 74 so that the middle portions of the pivot arms 118 and 120 are pivotally mounted on tubular sleeves 130 which cover the stud portion of pair of bolts 132 extending respectively through holes 122 and 126 and holes 124 and 128. The bolts 132 are secured in place by means of nuts 134 applied to the ends of bolts.

A first pair of oppositely aligned ends of the pivot arms 118 and 120 support a bracket assembly, generally designated 138, axially extending under the coiled bar resistors and between the ends of the support member 60. The bracket assembly 138 is attached to middle portions of each of the coil turns between the coil ends of the resistors 54, 56 and 58. An opposite pair of aligned ends of the pivot arms 118 and 120 support a counterweight member indicated at 140 with the counterweight and bracket assembly 138 being pivotally movable about bolts 132.

The bracket assembly 138 is illustrated in FIGS. 7 and 8 secured to the first pair of ends of the pivot arms by means of an elongated threaded rod or bolt 142. The bolt 142 extends through aligned openings 144 and 146, respectively provided in the first ends of pivot arms 118 and 120. The bolt 142 carries a pair of oppositely disposed end caps 148 having portions thereof extending within the annular openings 144 and 146. A first series of 10 insulating bushings designated 152 and a second series of nine insulating bushings designated 154 are provided on the bolt 142 and between the end caps 148. The insulating bushings 152 and 154 are formed of generally circular discs of a suitably strong and heat resisting insulation material. Each bushing includes a center hole mounted over the rod portion of bolt 142. The bushings 152 have an annular axially extending portion formed adjacent each center hole on either side thereof and the bushings 154 have a complementary annular recess portion formed adjacent the center holes having an internal diameter receiving the annular axially extending portions of bushings 152. The thicknesses at the outer circumferences of the bushings 152, 154 is reduced so as to provide annular recesses between the outer radial sides of mutually adjacent bushings 152 and 154.

A series of nine stirrup brackets 160 are secured in axially aligned relationship within the annular spaces provided between the insulating bushings 152 and 154. The stirrup brackets 160 are illustrated in FIG. 7 and are formed of a stainless steel material including a U-shaped cross section with a flat closed end 162 and parallel flat sides 164 and 166 which straddle one coil turn of the coiled bar resistors. Circular holes 168 are provided in the flat sides 164 and 166 in aligned relationship to receive the axially extending portions of bushings 152. Accordingly, the flat sides 164 and 166 of each stirrup bracket are interjacent bushings 152 and 154.

In FIG. 9, the sides 164 and 166 of the stirrup brackets 160 are shown clamped between the insulating bushings 152 and 154 and broken away so that the ends 162 and part of the sides are shown separately in a mounted position on each of the nine coil turns forming the three resistors 54, 56 and 58. Each row of stirrup brackets 160 extends between the first ends of a pair of pivot arms 118 and 120 and are clamped between the series of bushings 152 and 154 by the end caps 148 which are forced together by the head of the bolt 142 and a nut 170. The sides of the stirrup brackets maintain the spacing between adjacent coil turns of the resistors and prevent lateral vibrations. Correspondingly, the six pivotal linkages 102 and 106 through 112 provide six circumferentially spaced pivotal supports between the coiled bar resistors 54, 56 and 58 and the support member 60.

Referring further to the typical pivotal linkage 104 in FIG. 8, the counterweight 140 is secured to the second end of the pivot arms 118 and 120. The counterweight 140 is formed of 1 3/16 inch diameter steel bar material having a center bar portion approximately 6 3/16 inches long. The bar forming the counterweight 140 has intermediate diameter bar portions 171 at opposite ends of the center bar portion. The bar portions 171 respectively extend through aligned enlarged circular openings 172 and 174 respectively provided in the plate 78 and the radial end 74 of the support member 60. The diameter of the openings 172 and 174 relative to the diameter of the bar portions 171 permits approximately ⅜-inch movement of counterweight 140 relative to the support member 60. The counterweight 140 terminates in smaller diameter end portions 175 having external threads which extend through the openings 176 and 178 respectively provided in the second ends of pivot arms 118 and 120. A pair of nuts 180 are applied on ends of the counterweight 140 to clamp the pivot arms 118 and 120 respectively against the radial ends of the intermediate diameter portions 171.

The distance between the hole 124 and the annular opening 178 of the pivot arm 120 is approximately twice the distance between the hole 124 and the opening 146 with the corresponding openings of pivot arm 118 being similarly spaced. Accordingly, the movement and torque of each bracket assembly 138 relative to the counterweight 140 is suitably proportioned.

Referring now to the connections for mounting the respective coil ends 80 and 82, 84 and 86, 88 and 90; one of the coil ends of each resistor is secured to the support member 60 and the other coil ends are respectively connected to one of the terminal connections 182, 184 and 186 provided on the plate 78. The terminal connections extend from the inner radial end 72 of the support member and toward the rotor assembly 22 and are circumferentially spaced 120° apart.

Side views, in section, of the three terminal connections 182, 184 and 186 are respectively illustrated in FIGS. 3, 5 and 6. FIG. 3 illustrates the terminal 182, a first resistor end mounting arrangement including a stirrup bracket 188 and a connector assembly 190 which connects the resistor end 88 to terminal 182. The stirrup bracket 188 is a stainless steel stirrup bracket identical to the stirrup brackets 160 and is brazed by an inert gas welding process to the end 88 of the resistor 58. The connector assembly 190 is formed by layers of conductive strap material such as copper to form an electrically conductive connector member.

An axially extending center section 192 of the connector assembly 190 includes a flat stiffener part 193 which in one preferred embodiment is made of iron to reduce vibrations in the connector. One connector end 194 extends radially outwardly and is silver soldered to the inner sides of the stirrup bracket 188. Aligned holes 196 are provided in the sides of bracket 188 and they respectively receive annular axially extending portions of a pair of oppositely disposed insulating disc bushings 198 and 200. The bushings 198 and 200 are made of suitable insulation material and include center holes formed in annular axially extending center portions which receive the shank portion of a bolt 202. The bolt 202 is mounted to a radial location including a boss 204 formed on an inner surface extending from the radial end 74 at the outer circumference of the support member 60. The connector end 194 includes a hole opening that also fits over the annular extending center portions of the bushings 198 and 200 so that both connector end 194 and resistor coil end 88 are secured to the support member at boss 204 and electrically insulated from it.

A second connector end 206 extends radially inward and is secured to terminal connection 182. At terminal connection 182, a bolt 208 forms a terminal member which extends through a hole in the connector end 206 and is supported by a pair of oppositely disposed insulating bushings 212 and 214 similar to the bushings 198 and 200 and having annular axially extending center portions placed in a hole 216 of plate 78. Accordingly, the connector end 206 and terminal 182 are electrically insulated from the plate 78 just as the resistor end 88 and the connector end 194 are insulated from the support member. A flat nut 220 and the head of bolt 208 clamp the bushings 212 and 214 together against the edges of the hole 216. An end of a flat cable conductor 226 is placed over bolt 208 and a nut 230 secures the conductor 206 in electrical contact with the connector end 206.

In FIG. 4, there is shown a connector assembly 238, similar to connector assembly 190, that is connected between the terminal connection 184 and a resistor end mounting arrangement including a stirrup bracket 240 which is identical to the end mounting arrangement of FIG. 3. The bracket 240 is welded to the end 84 of the resistor 56 and is secured to an inner radial supporting location including a boss 242 which is adjacent and below the coil end 84. An end of a flat cable conductor 246 is connected to the coil end 84 by the connector assembly 238 at the terminal 184.

The coil end 80 of the resistor 54 is welded to a stirrup bracket 248 mounted as are the stirrup brackets 188 and 240 on a radial supporting location extending from the radial end 74 and terminating in boss 250 formed at a location radially adjacent the coil end 80. A connector assembly 252 extends a short axial distance between bracket 248 and the terminal connection 186 and does not require a stiffener part. One end of a flat cable conductor 256 is secured to the terminal 186 so as to be connected to the resistor coil end 80. The sections projecting axially from the inner side of the outer radial end 74 and terminating in the supporting locations including bosses 204, 242 and 250 are circumferentially spaced 120° apart so that stirrup brackets 188, 240 and 248 are equally spaced around the support member to maintain balance of the assembly 42.

The conductors 226, 246 and 256 are respectively connected to one of three terminal leads of the rotor winding 26 as illustrated in FIG. 1. The conductors 226, 246 and 256 respectively extend between the terminal connections 182, 184 and 186, through axial notches 258 provided in the bearing sleeve 38 and are respectively connected to one of three rotor terminals 260.

The remaining coil ends 82, 86 and 90 of the coiled bar resistors are connected to support member 60 as in one typical mounting arrangement illustrated in FIG. 4 which shows coil end 90 of resistor 58 mounted on an outer radial supporting area 266 of support member 60 also formed on the inner side of the radial end 74. A stirrup bracket 268 which is identical to the brackets 160 described hereinabove is welded to the end 90. The remaining space between the sides of bracket 268 is filled by a copper plate 270 which is silver soldered to the inner side surfaces of the bracket. The plate 270 includes a hole aligned with aligned holes in the sides of the bracket 268 and is secured within the stirrup bracket 268 and to the radial supporting location 266 which is adjacent the pivot arm 118 of the pivotal linkage 112. A bolt 274 extends through a hole provided in the supporting location 266 and through the side openings of the stirrup bracket, the plate 270, and a pair of copper washers 276. The washers 276 fit within the side openings of the bracket 268 and are silver soldered to the sides of the plate 270. A nut 282 secures the bolt 274 and the bracket 268 to the support member 60. The stirrup bracket 268 electrically connects the coil end 90 and the support member 60.

Two stirrup brackets 284 and 286, illustrated in FIGS. 2 and 9, are respectively connected to the coil ends 86 and 82 and are mounted and electrically connected to the support member 60 in similar arrangements secured to supporting locations extending from the inner surface of the radial end 74 as that described for the stirrup bracket 268. The stirrup bracket 284 is mounted adjacent pivotal linkage 104 and the bracket 286 is mounted approximately 120° circumferentially between stirrup brackets 268 and 284 and adjacent pivotal linkage 108. Since the support member is formed of aluminum which is a good electrical conductive material, the coil ends 82, 86 and 90 are connected in a common electrical connection that connects the three coiled bar resistors 54, 56 and 58 in a wye circuit configuration.

Figure 10:
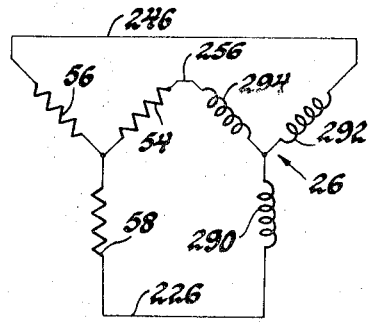
FIG. 10 illustrates a schematic electrical diagram for the dynamoelectric machine illustrated in FIG. 1.

In FIG. 10, an electrical schematic diagram illustrates the coiled resistor bars 54, 56 and 58 and the rotor winding 26 comprising wye-connected phase windings 290, 292 and 294. The coiled bars resistor 58 is connected to the phase winding 290 of the rotor winding by the conductor 226. Similarly, the coiled bar resistor 56 is connected by conductor 246 to the phase winding 292 and the coiled bar resistor 54 is connected by conductor 256 to the phase winding 294.

The ends of the coiled bar resistors 54, 56 and 58 are fixedly mounted, as described hereinabove, on the support member 60 at six circumferentially and symmetrically spaced locations and the middle coil portions are movably supported by the pivotal linkages 102, 104, 106, 108, 110 and 112 which are also circumferentially equally spaced around the support member 60. When the shaft 24 is at rest, the pivot arms of the pivotal linkages assume a neutral position so as to apply no or only nominal radial force on the coil turn so that they also have a neutral position. At blocked rotor or low rotor speed conditions and when a large rotor current is developed through the rotor windings and accordingly through the rotor resistors, the resistors become heated to high temperatures. The coil turns of the resistors experience thermal expansion and expand circumferentially from the fixed resistor ends so that the resistors freely move in the radially outward direction. This moves the pivotal linkages so that the counterweights 140 and the counterweight ends of the pivot arms are moved radially inward whereby the counterweights 140 are moved toward the radially inner edges of the holes 172 and 174. When the motor is operating at lighter loads and less current is drawn through the rotor resistors, the resistors become cooled by air circulated by the fan impeller 68 and the resistors contract toward the neutral position.

At high motor speeds, the counterweights 140 are forced radially outward by centrifugal forces so that the pivotal linkages cause the bracket assemblies 138 to be forced radially inward. Accordingly, the closed ends 162 of the stirrup brackets 160 exert radially inward forces at the six circumferentially spaced locations where the stirrup brackets are attached to the coil turns of the resistors. As noted hereinabove, the sides of the stirrup brackets 160 prevent lateral movements of the coil turns and maintain the ventilating spaces between the adjacent coil turns of the resistors. Accordingly, the bracket assembly 138 restrains the coiled bar resistors so as to dampen vibrations in the coils as they are rotated at high speeds.

The fan impellers 68 circulate air flow through the resistors 54, 56 and 58 as air is drawn in the cover 44 through the vent openings 48, as indicated by the arrows in FIG. 1. The baffle 50 directs air flow outwardly and across the exposed surfaces of the resistors. The air is circulated through and around the coil turns and along the inner surface of the cover 44 and out the end of the cover 44 and around the outer surface of the motor housing which includes heat radiating fins that are integral with the main frame 18. A minimum of air turbulence and vibration and noise has been found developed by the rotor resistor assembly of this invention when operated to speeds in the order of 2,250 r.p.m.

The present invention provides an improved rotor resistor assembly including an aluminum support member 60 enclosed by an aluminum cover 44 attached to a motor housing so that an overall assembly is formed which is lightweight, rugged and is easily handled and mounted. Rotor resistor heat losses which are developed in high-slip, fan-cooled motors of the type described herein are efficiently dissipated by the air circulation of the fan impellers 68 and the circular coil shape of the bars forming the resistors 54, 56 and 58. The resistors include maximum cooling area surfaces while having a minimum of wind resistance to the circulating air. The movable mounting assemblies 102 through 112 provide circumferential support of the resistors so that they can expand and contract relative to the support member throughout widely variable cyclic heating, cooling and speed conditions to provide long service life under heavy-duty operating conditions.

While the embodiment of the present invention as herein disclosed constitutes a preferred form, it is to be understood that other forms may be adopted in accordance with this invention.

We claim:

1. A rotor resistor assembly for an electric motor including a stator, a rotor including a shaft, and a winding carried by said shaft and rotatable relative to said stator, said rotor resistor assembly comprising: a support member including a hub mounted on said shaft terminating in axially spaced radial end portions; a plurality of coiled bar resistors, said coiled bar resistors formed by metal bars having a predetermined resistance and forming coils having a plurality of spaced substantially circular coil turns extending circumferentially around said hub and progressing axially between said radial end portions; a plurality of movable mounting assemblies supported for movement relative to said radial end portions of said support member; plural bracket means extending axially from said movable mounting assemblies for connecting said plurality of movable mounting assemblies to said substantially circular coil turns of said coiled bar resistors at equally circumferentially spaced locations, whereby said coil turns of said coiled bar resistors are mounted in a balanced relationship to said support member for preventing lateral movement with limited radially inward and outward movement being provided relative to said support member in response to variations in thermal expansion and to centrifugal forces developed on said coil bar resistors when said shaft is rotated at high speeds; and conductor means electrically connecting said coiled bar resistors to said windings of said rotor.

2. A rotor resistor assembly for an electric motor including a stator, a rotor including a shaft, and a winding carried by said shaft and rotatable relative to said stator, said rotor resistor assembly comprising: a support member including a hub mounted on said shaft terminating in axially spaced radial end portions; a plurality of coiled bar resistors formed by metal bars having a predetermined resistance and wound in coils extending circumferentially around said hub and forming plural coil turns progressing axially between said radial end portions; a plurality of pivotal linkages including first and second ends and middle portions intermediate said first and second ends; means connecting said first ends of said plurality of pivotal linkages to said plurality of coiled bar resistors; means pivotally connecting said middle portions of said plurality of pivotal linkages on equally circumferentially spaced locations of said radial end portions of said support member so that said pivotal linkages are movably mounted relative to said support member in a rotationally balanced relationship whereby said coiled bar resistors are movable radially inward and outward relative to said support member in response to variations in thermal expansion and to centrifugal forces developed when said shaft is rotated at high speeds; a counterweight means connected to said second ends of said plurality of pivotal linkages for applying radial inward forces to said coiled bar resistors to restrain the radially outward movement of said coils when said shaft is rotated at high speeds; and conductor means for connecting said coiled bar resistors to said winding of said rotor.

3. A rotor resistor assembly for a dynamoelectric machine having a stator and a rotor including a shaft carrying a polyphase winding having plural phase windings rotatable relative to said stator, said rotor resistor assembly comprising: a support member mounted on said shaft including a hub terminating in radial end portions; a plurality of substantially identical resistors including one resistor for each of said plural phase windings wherein said resistors are formed by metal bars having substantially identical lengths and predetermined resistances, each of said metal bars being formed in a coil forming a plurality of substantially circular coil turns terminating in first and second coil ends, said coil turns being circumferentially disposed about said hub and wound progressively in an axial direction extending between said radial end portions of said support member with the sides of said coil turns being mutually spaced apart a predetermined axial distance for providing heat radiating surfaces exposed to air circulated therebetween; said first coil ends of each coil being equally circumferentially spaced relative to said first coil ends of the other coils and said second coil ends of each coil being equally circumferentially spaced relative to said second coil ends of the other coils; means fixedly mounting said first coil ends and said second coil ends on said support member so as to maintain said circumferentially spaced relationship of said first and said second coil ends, whereby said resistors are symmetrically mounted to maintain rotational balance of said rotor resistor assembly and are expandable between said first and second coil ends; and electrical conductor means electrically connecting said first coil ends and said second coil ends in a circuit including each of said phase windings of said rotor.

4. In a wound rotor induction motor, the combination comprising: a frame; a stator carried on said frame; a shaft rotatably supported by said frame and including a shaft extension extending externally of said stator; a rotor secured to said shaft including polyphase windings mounted for rotation adjacent said stator; a support member including a hub mounted on said shaft extension and a fan impeller means extending radially of said hub, said support member further including a pair of end portions extending radially from the ends of said hub, one end portion of said pair of end portions including a plurality of terminal connections insulated from each other and from said one end portion and the other end portion of said pair of end portions being formed of an electrically conductive material and including terminal connections being electrically interconnected by said electrically conductive material; a resistor assembly including plural resistors made of a stainless steel bar material and formed in axially aligned coils formed by coil turns wound circumferentially around said hub and progressing axially in mutually spaced relationship between said pair of end portions of said support member, each of said coils including first and second coil ends which are axially spaced relative to each other and to said pair of end portions of said support member; a plurality of movable mounting assemblies supported for movement relative said support member including insulatingly interconnected and spaced-apart stirrup brackets connected to each of said coil turns forming said resistors for maintaining said mutually spaced relationship between each of the circumferentially wound coil turns; conductor means electrically connecting said first coil ends to said plurality of terminal connections of said one end portion; conductor means electrically connecting said second coil ends to said terminal connections of said other end portion, thereby electrically interconnecting said second coil ends; and conductor means connecting said plurality of terminal connections of said one end portion to said polyphase windings of said rotor, whereby said resistors are connected in a wye-connected rotor resistance circuit and to said polyphase windings of said rotor.

5. In a wound rotor induction motor, the combination comprising: a frame; a stator carried on said frame; a shaft rotatably supported by said frame and including a shaft extension externally of said stator; a rotor secured to said shaft including wye-connected three phase windings mounted for rotation adjacent said stator; three resistors including metal bars forming axially aligned coils formed by plural coil turns extending circumferentially around said shaft extension and progressing axially along said shaft extension whereby said coil turns are mutually axially spaced with said coils respectively terminating in first and second coil ends; a support member including a hub, a pair of axially spaced end portions extending radially outward at the opposite ends of said hub, and circumferentially spaced locations extending axially from said pair of end portions providing supporting surfaces for mounting of said first and second coil ends of said resistors to said support member; a fan means included on said support member including axially extending impellers which develop circulating air through the spaces between said coil turns when said support member is rotated; means for fixedly mounting said first and second coil ends of said resistors to said supporting surfaces of said pair of end portions; a plurality of pivotal linkages each including a pair of parallel pivot arms circumferentially disposed around the outer edges of said pair of end portions of said hub; a bracket assembly for connecting each of said coil turns of said resistors to first ends of said pair of pivot arms; plural counterweight members connected to said second ends of said pair of pivot arms; means for pivotally connecting a middle portion of each of said pair of pivot arms to said pair of end portions of said support member whereby said resistors are mounted to said support member for radially inward and outward movement between said first and second coil ends in response to variations in thermal expansion and to centrifugally developed forces when said shaft is rotated at high speeds and further have a radially inward restraining force applied thereto due to centrifugal force developed on said plural counterweight members when shaft is rotated; and means for respectively connecting said first coil ends of said resistors to each of said three phase windings of said rotor and means electrically interconnecting said second coil ends of said resistors, whereby said resistors form a wye-connected rotor resistance circuit for producing predetermined torque and speed characteristics of said wound rotor induction motor.

6. In a wound rotor induction motor, the combination comprising: a frame; a stator carried on said frame; a shaft rotatably supported by said frame and including a shaft extension externally of said stator; a rotor secured to said shaft including three phase windings connected in a wye configuration and mounted for rotation adjacent said stator; three resistors formed by metal bars having a predetermined resistance and forming axially aligned coils formed by plural coil turns extending circumferentially around said shaft extension and progressing in axially spaced relationship along said shaft extension between first and second coil ends; a support member including a hub, a pair of axially spaced end portions extending radially outward at the opposite ends of said hub with a series of circumferentially spaced pairs of axially aligned hole openings formed adjacent the outer edges of said pair of end portions, and said pair of end portions further including plural circumferentially spaced locations extending axially from the inner sides thereof for providing supporting surfaces for said first and second coil ends; a fan means carried by said support member including axially extending impellers for developing circulating air flow through the spaces between said coil turns when said support member is rotated; means for fixedly mounting said first and second coil Ends of each of said coils to said supporting surfaces of said pair of end portions; a plurality of pairs of parallel extending pivot arms circumferentially disposed around the outer edges of said pairs of end portions having first and second ends disposed in mutual axial alignment; a bracket assembly including a rodmember connected between said first ends of each pair of pivot arms, said rod member carrying a plurality of annular bushings formed on an insulating material and a plurality of U-shaped stirrup brackets having closed ends and parallel sides extending from said closed ends, each of said closed ends extending over an outer circumferential side portion of one of said coil turns with said parallel sides being clamped between adjacent bushings and to the sides of said coil turns for connecting each of said coil turns to said first ends of said pivot arms, whereby said coil turns are axially interconnected in mutually spaced relationship and supported so as to prevent lateral movement at circumferentially spaced locations; counterweight members formed by elongated bars having ends extending through said pairs of aligned hole openings for limited movement therein and connected to said second ends of said pairs of pivot arms; means for pivotally connecting middle portions of said plurality of pairs of pivot arms to said pair of end portions of said support member whereby said resistors have radially inward restraining forces applied thereto due to centrifugal forces developed on said counterweight members when said shaft is rotated, and further whereby limited pivotal movement of each of said plurality of pairs of pivot arms is provided by the limited movement of said counterweight members, so that said coils have restrained radially inward and outward movement between said first and second coil ends in response to variations in thermal expansion and to centrifugally developed forces when said shaft is rotated at high speeds; and means for respectively electrically connecting said first coil ends to each of said three phase windings of said rotor and means electrically interconnecting said second coil ends, whereby said resistors form a wye-connected rotor resistance circuit for producing predetermined torque and speed characteristics of said wound rotor induction motor.